May 2, 1939.　　　G. D. SCHWEIGERT　　　2,156,740
FLY-BOOK CASE
Filed June 22, 1937　　　2 Sheets-Sheet 1
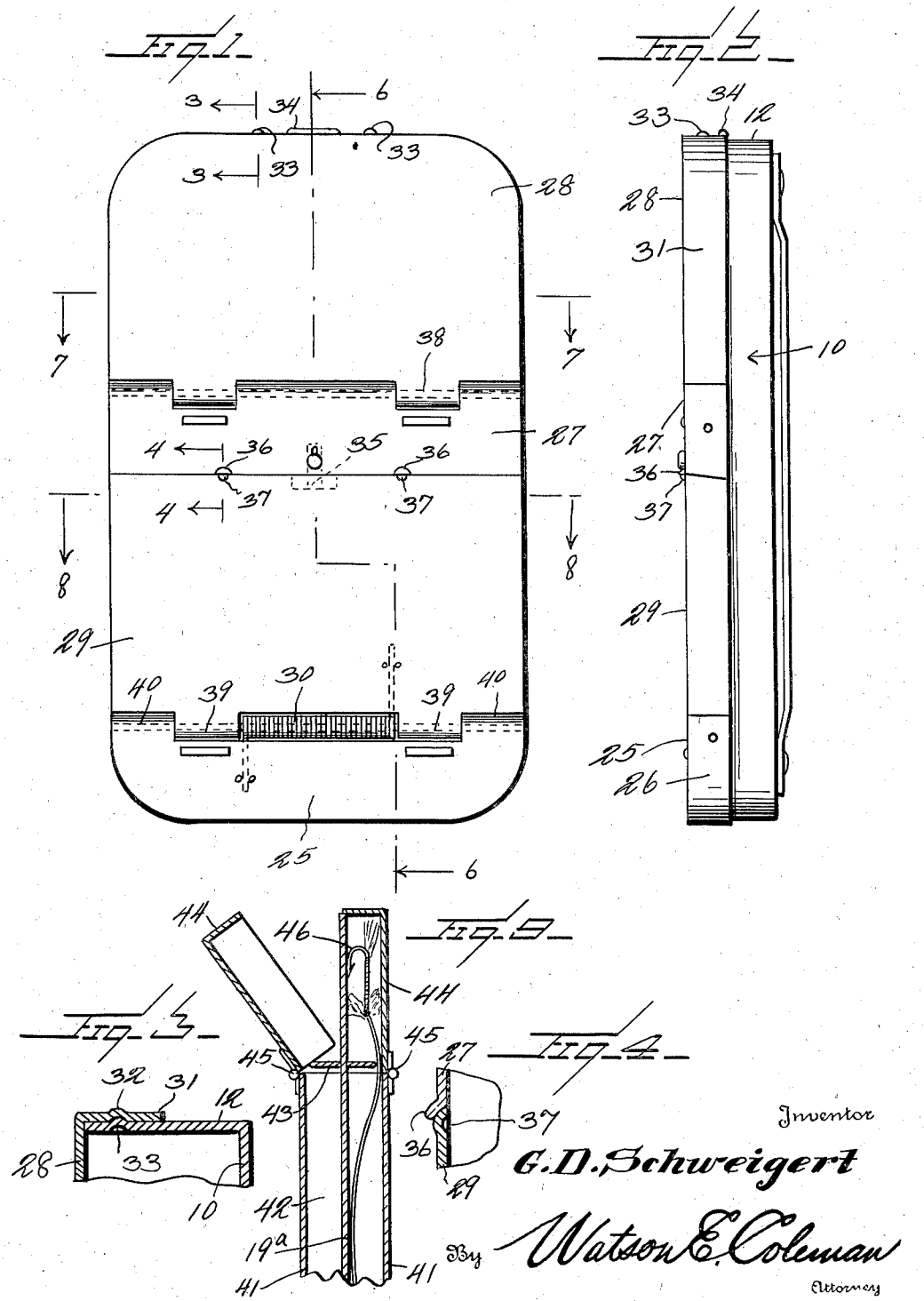

May 2, 1939.　　　G. D. SCHWEIGERT　　　2,156,740
FLY-BOOK CASE
Filed June 22, 1937　　　2 Sheets-Sheet 2
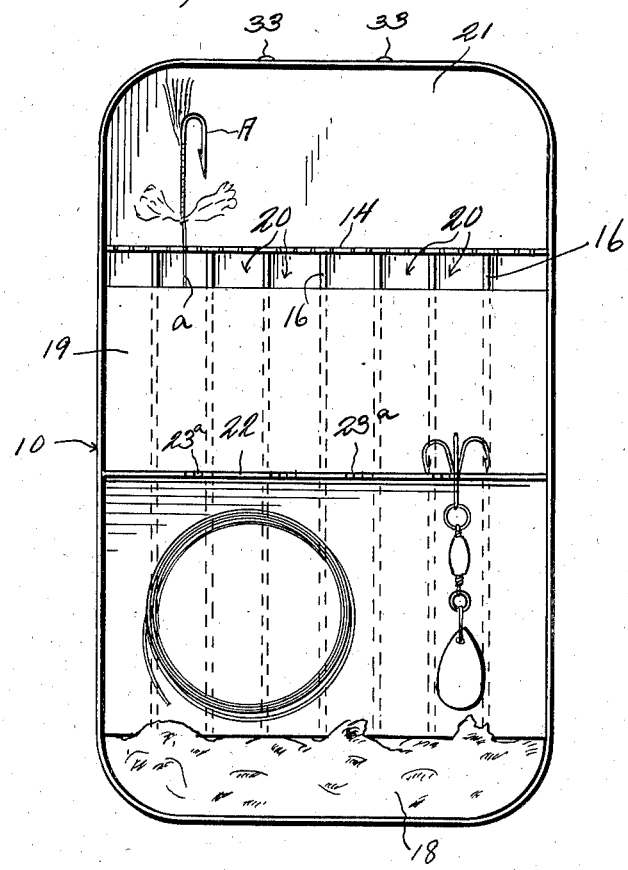
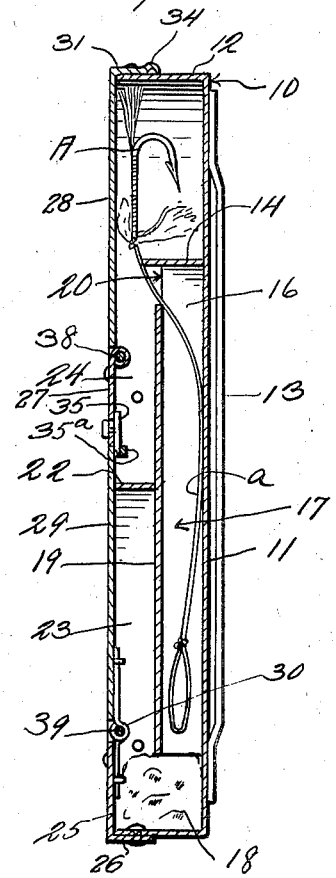
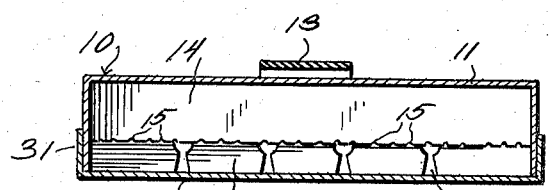
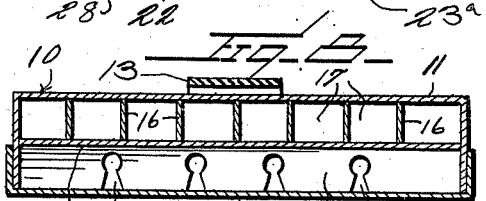
Inventor
G. D. Schweigert
By Watson E. Coleman
Attorney Patented May 2, 1939

2,156,740

UNITED STATES PATENT OFFICE 2,156,740

FLY-BOOK CASE

George D. Schweigert, Denver, Colo.

Application June 22, 1937, Serial No. 149,731

11 Claims. (Cl. 43—32)

This invention relates to "flybooks" or "baitbooks", as they are called, and particularly to a book or case adapted to support flies with their accompanying leaders, spinners, small spoons and other small fishing tackle.

The general object of the present invention is to provide a book or case particularly adapted to contain the tackle mentioned and which case may be readily attached, if desired, to the belt of a fisherman and will permit him to have easy access to individual flies and leaders within the case, to individual spinners or other devices of like nature within the case or to fishing tackle, without the necessity of withdrawing from the case a number of flies or other articles which are not desired in order to get at the article which is desired.

Another object is to so form the body of the case that it is divided into a plurality of longitudinal compartments or "tubes" each compartment opening into a large compartment common to all of the longitudinal compartments whereby the leaders of flies or other hooks may be disposed within the long compartments or tubes with the hooks or flies disposed within the large compartment where they may be readily selected, as desired, and withdrawn, and a further object in this connection is to provide means whereby the leaders, which being of gut, are resiliently stiff, may be put under slight stress or tension, which will prevent accidental dislodgement of the leaders and flies and with the hooks in position to permit the ready removal of the desired fly and leader.

A further object is to provide a case or flybook having not only such compartments, as before stated, but having means for securely holding a plurality of spinners or other hooks in place and permit a ready selection thereof and further to provide a compartment within which coiled leaders or other articles may be placed and kept.

Still another object is to provide a case having an upper hinged cover or door for access to the fly containing compartment and a lower, independently hinged door or cover for access to the compartment containing spinners or the like, or to the compartment containing miscellaneous articles.

Other objects have to do with certain details of construction and arrangement of parts as will appear more fully hereinafter.

My invention is illustrated in the accompanying drawings wherein:

Fig. 1 is a face or plan view of a case constructed in accordance with my invention and with the doors closed.

Fig. 2 is a side elevation of the case shown in Fig. 1.

Fig. 3 is a fragmentary section on the line 3—3 of Fig. 1.

Fig. 4 is a fragmentary section on the line 4—4 of Fig. 1.

Fig. 5 is a plan view of the body of the case with the top or cover entirely removed.

Fig. 6 is a longitudinal section on the line 6—6 of Fig. 1.

Fig. 7 is a section on the line 7—7 of Fig. 1, looking in the direction of the arrows.

Fig. 8 is a section on the line 8—8 of Fig. 1, looking in the direction of the arrows.

Fig. 9 is a fragmentary longitudinal section showing a modification of my invention.

Referring to these drawings, it will be seen that my flybook or case comprises a body designated generally 10, which is rectangular in plan view, as shown in Fig. 5, and is provided with a bottom 11 and an outstanding marginal wall 12. Preferably the corners of the case are rounded, as shown in Fig. 5, though this is not an essential feature. To the back of the bottom or back of the body is attached the strap 13 whereby the case may be attached to a belt or coat.

Extending outward from the rear wall 11 of the case is a transversely extending partition wall 14, the outer edge of which is serrated, as shown in Fig. 7 at 15. This wall 14 extends outward from the rear wall 11 of the face of the case but is less in depth than the depth of the peripheral wall 12, as shown clearly in Fig. 6. Extending longitudinally of the case from the wall 14 downward are a plurality of longitudinally extending partition walls 16 dividing the interior of the body adjacent the rear wall 11 into a plurality of longitudinally extending compartments 17. These compartments are relatively long and relatively narrow. These walls 16 terminate preferably short of the lower portion of the peripheral wall 12, as shown in Fig. 6, so that a sponge 18 or other moisture absorbent material may be disposed in the body of the case below the lower ends of the longitudinal wall 16.

Extending over the outer edges of the longitudinal wall 16 and extending from one side wall of the body to the other is a plate or sheet 19 of thin material which at its lower edge is coterminous with the lower ends of the longitudinal walls 16 but terminates short of the transverse wall 14, so that an opening 20 is left at one end of each of the longitudinal compartments. The purpose of the compartment 21, which is relatively large and defined by the wall of the body and by the transverse wall 14, is to contain flyhooks with their flies while the leaders attached to the flyhooks, as illustrated in Fig. 6, extend over the outer edge of the wall 14, then inward and through the openings 20 and then longitudinally along the compartments 17. As shown in Fig. 6, the leader $a$ of the hook A, because of the stiff resiliency of the gut from which the leader is made, bears against the adjacent end of the sheet 19 and bears against the outer edge of the wall 14 and the end of the leader will naturally be disposed in one of the notches 15. Thus the leaders are kept more or less straight within the long and narrow compartments 20, the hooks with their flies are retained in the large compartment 21 where they are not likely to be damaged or injured and, if a moistened sponge 18 is used, the air in the compartments 17 will be moistened and the leaders kept in good condition.

Extending transversely across the case and outward of the plate or web 19 is a transverse partition 22, which is deeply notched at intervals, as at 23ª. This transverse wall 22 is disposed below the upper end of the sheet, web or wall 19, as shown in Fig. 6, so as to define a compartment 23 below the wall 22 and a compartment 24 above this wall. The hooks of a spinner or spinners may be disposed within the compartment 24 while the shanks of the hooks will pass through the notches 23ª and the spinner disk and the chain connected to the hooks will be disposed within the compartment 23. This compartment 23 is also convenient for holding coiled gut or other small articles which may be necessary to the fisherman. If coils of gut or gut leaders are disposed within the compartment 23, then they will be preserved in good condition by the moisture within the sponge 18 which has access to the compartment 23 from the lower end thereof.

While I do not wish to be limited to the particular construction of the cover or outer plate of the case, preferably it consists of two doors and two supporting members for the doors. As illustrated, particularly in Figs. 1 and 6, the lower end of the case is formed with a transverse member 25 which has a lateral flange 26 shown as riveted to the side wall of the body of the case, it being understood, however, that I do not wish to be limited to rivets, as other means for attaching the member 25 to the side wall might be used. Extending transversely across the middle portion of the body 10 is a member 27 which has its ends turned down to fit against the outside faces of the rim 12 and which is riveted or otherwise attached thereto.

Extending over the compartment 21 and the upper ends of the longitudinal compartments 20 is a door 28. This is operatively hinged to the cross-piece 27 so that it may be opened or closed conveniently and this door 28 is normally held closed by any suitable means, such, for instance, as will be later described. The compartment 23 is closed by means of a door 29 hinged to the transverse member 25. This door is preferably urged to a closed position by means of a spring 30. Inasmuch as the door 28 has a marginal portion 31 which extends down around the rim of the body 10, as shown in Fig. 6, it is not necessary to provide a spring for holding this door 28 closed, though the spring may be provided, if desired. As illustrated, the door is held closed by forming the flange 31 as shown in Fig. 3, with an indented portion 32 and forming the rim 12 of the body with a protuberance 33 which will snap into the indentation 32 when this door is closed. The door 28 may be readily opened by the protuberant finger-piece 34, shown in Fig. 6. Any other suitable means for permitting the fingers to secure a hold upon the door may be provided and other suitable means may be used for holding the door closed.

The door 29 is shown as held closed by a sliding latch designated generally 35 engaging with a keeper 35ª and the door is also held closed, not only by the spring 30, but by the provision of lips 36 and 37, as shown in Fig. 4, which will pass each other when the door is closed, but which will permit the ready opening of the door, these lips being somewhat elastic. Preferably, while I do not wish to be limited to this, the doors 28 and 29 are formed with rolled lugs or beads 38 which extend around transversely extending pintles 39, the cross-pieces 25 and 27 being each provided with complemental beads 40 which are rolled around the pintle 39. This provides a convenient way of hinging the doors 28 and 29 to the supporting cross-pieces 25 and 27. The spring 30 normally urges the door 29 to a closed position, but it is obvious that if desired, the spring might act reversely to cause the opening of the door 29 when the latch is released, and it is also obvious that a spring might be used for the same purpose on the door 28 to cause it to open when the fisherman wishes to get at a flyhook very quickly and can only use one hand.

It will be seen that with this construction a plurality of flyhooks with their corresponding flies may be kept in a separated position within the compartment 21 and in such position that the hook may be readily lifted from said compartment and will draw with it the snell or leader $a$. It will also be obvious that the leaders may be readily threaded into the several compartments 17 when desired. The notches 15 will also retain the leaders in a separated condition and this is further secured by the stress on each leader caused by the passage of the leader against the upper edge of the web 19 and over the outer edge of the wall 14. The friction exerted upon the leader tends to prevent the hooks and leaders from dropping downward and, of course, even if the leader and hook do drop downward, the hook would catch on the part 14. The flies with their leaders are held from any entanglement with the spinner hooks or other devices and the spinner hooks themselves are so supported that the hooks cannot become entangled with coiled leaders contained within the compartment 23. The leaders $a$ are held in a more or less straight position so that they are in condition for instant use.

I do not wish to be limited to any particular material for this case or flybook, but it may be conveniently made of transparent celluloidal material whereby the angler can see just what is present within the case without having to open it.

In Fig. 9, I have illustrated the fact that under some circumstances, a double flybook might be provided having an intermediate wall or plate 19ª, the two outer walls 41, longitudinal walls 42 dividing the space on each side of the wall 19ª into longitudinally extending compartments. Attached to the intermediate wall 19ª is a transverse wall 43 spaced from the ends of the outer walls 41. Hinged to the upper ends of the outer walls 41 are the doors 44 hinged at 45 and defining a hook and fly compartment 46. The edges of the transverse wall 43 may be notched in the same manner as the transverse wall 14 is notched and the leaders a will be deflected outward over the edge of the wall 43. This device as just described provides for a double row of compartments for containing a double row of hooks and leaders and has, to a large extent, the same advantages as the construction heretofore stated, and while I have illustrated in Figs. 1 to 8 a construction which I have found to be extremely practical, I do not wish to be limited to the details of this construction or to the exact arrangement of the parts except as stated in the appended claims.

What is claimed is:

1. A flybook comprising a case having a body divided by partitions into a plurality of relatively long longitudinally extending compartments adapted to contain leaders, the compartments terminating short of one end of the case, and a relatively large compartment at this end of the case into which the longitudinal compartments open and adapted to contain the flies associated with said leaders, the case at its opposite end from the large compartment being formed with a compartment opening into all of the longitudinal compartments and containing a moisture retaining element.

2. A flybook comprising a case having a body and a covering element, the body having a transversely extending partition adjacent one end less in height than the depth of the body and having a plurality of longitudinally extending compartments extending at right angles to the transverse partition, the depth of said compartments being less than the depth of the body, a covering plate extending over the longitudinal compartments, the covering plate terminating short of said partition whereby if a hook is disposed within the first named compartment and the leader thereof disposed within one of the longitudinal compartments, the leader will be deflected outward across the end of the transverse partition.

3. A flybook comprising a casing having a body formed with a peripheral wall or flange, the body having a transversely extending partition adjacent one end, the partition being less in height than the peripheral wall of the body and defining a transverse compartment between the partition and said peripheral wall, the body below said partition being formed to provide a plurality of longitudinally extending compartments closed on four sides, the side walls of the compartments being less in depth than the depth of said partition and the outer wall of each compartment terminating short of the partition whereby to leave an opening between said outside wall and the partition through which a leader may be disposed, the first named compartment defined between the partition and the upper end of the body being adapted to contain the hook of said leader.

4. A flybook comprising a case having a body formed with a peripheral wall or flange, the body having a transversely extending partition adjacent one end, the partition being less in height than the peripheral wall of the body, the peripheral wall and the partition defining between them a transverse compartment, the body below said partition being formed to provide a plurality of longitudinally extending compartments closed on four sides, the side walls of the compartments being less in depth than the depth of said partition and the outer wall of each compartment terminating short of the partition whereby to leave an opening between said outside wall and the partition through which a leader may be disposed, the first named compartment defined between the partition and the upper end of the body being adapted to contain the hook of said leader, the longitudinal compartments being open at their lower ends and the body being formed to provide a compartment for the retention of absorbent material into which the lower ends of the longitudinal compartments open.

5. A flybook comprising a case having a body formed with a peripheral wall, the body having a transverse partition adjacent one end less in height than the height of the peripheral wall, the body below said transverse partition having longitudinally extending walls defining a plurality of elongated compartments, the longitudinal walls being less in height than the partition, a web extending over the outer edges of the longitudinal walls to form the outer walls of said compartments, said web terminating short of the partition, a second transverse partition extending outward from said web to thus divide the body exteriorly of the web into two compartments and doors operatively mounted upon the body, one of said doors being associated with the lower compartment and the upper of said doors being associated with the compartment formed above said last named transverse partition, the transverse partition being deeply notched at intervals.

6. A flybook comprising a case having a body provided with a peripheral wall, the body having a transverse partition adjacent one end less in height than the depth of the body, the outer edge of the partition being notched, the body below said case having longitudinally extending walls projecting from the back of the body and abutting against said partition wall, the longitudinally extending walls being less in height than the partition wall, a web attached to and extending over the outer edges of said longitudinal walls, the web terminating short of the transverse partition wall, a second transverse partition extending outward from said web and disposed approximately midway of the body, transversely extending cross-pieces attached to the body and extending over the outer face thereof, one being disposed at the lower end of the body and the other medially of the body, upper and lower doors operatively hinged to the respective cross-pieces, and means for latching said doors in closed position.

7. A fly book or case having parallel front and rear walls and an interior longitudinal partition extending in a plane parallel to the planes of the front and rear walls and dividing the case into two sections, said partition extending beyond the front and rear walls at one end, longitudinal partition walls in each section and extending between the adjacent outer wall and the partition and dividing each section into a plurality of longitudinally extending leader-containing compartments, a transverse partition extending partly across the outer ends of the leader compartments, and two hollow elements hinged respectively to the front and rear walls of the case and when closed abutting at their edges against the first named partition to thereby define two fly containing compartments.

8. A fly carrier, including a back plate, a plurality of longitudinally extending leader compartments defined by walls attached to the back plate, and a transverse wall extending from the back plate across the mouths of the compartments and partially obstructing the mouths and constructed and arranged to deflect a leader inserted within the leader compartment and thus frictionally detain the leader in its compartment.

9. A fly carrier, including a body constructed and arranged to form a longitudinally extending leader compartment and a compartment for flies attached to said leaders, and means between the leader compartment and the fly compartment constructed and arranged to deflect and frictionally engage the leader at the point of juncture of the leader compartment with the fly compartment.

10. A fly carrier, including a body having end and side walls and a cover therefor, a longitudinally extending leader compartment formed in the body and terminating short of one end wall thereof and open at this end, and a partition transverse to the longitudinal compartment and spaced from the open end thereof, the space defined between the partition and the adjacent end wall of the body constituting a fly hook compartment, the transverse partition acting to deflect the leaders disposed in the leader compartment and frictionally detain the leader against accidental removal.

11. A fly carrier, including a body formed to provide a longitudinally extending leader compartment defined by surrounding walls, a transverse partition disposed adjacent the mouth of the leader compartment and partially obstructing said mouth, and a hinged element hinged to the end of the body and when closed defining a fly hook compartment separated from the leader compartment by the transverse partition.

GEORGE D. SCHWEIGERT.